United States Patent
Miyata

[11] Patent Number: 5,571,526
[45] Date of Patent: Nov. 5, 1996

[54] COMPOSITE METAL HYDROXIDE AND ITS USE

[75] Inventor: Shigeo Miyata, Takamatsu, Japan

[73] Assignee: Kabushiki Kaisha Kaisui Kagau Kenkyujo, Kagawa-ken, Japan

[21] Appl. No.: 351,537

[22] Filed: Dec. 7, 1994

Related U.S. Application Data

[60] Division of Ser. No. 63,055, May 19, 1993, Pat. No. 5,401,442, which is a continuation-in-part of Ser. No. 825,276, Jan. 24, 1992, abandoned.

[30] Foreign Application Priority Data

Feb. 6, 1991 [JP] Japan ........................ 3-036816

[51] Int. Cl.⁶ ............... C08K 3/00; C09K 21/02; C09K 21/14
[52] U.S. Cl. ............ 424/435; 424/434; 424/414; 252/609; 423/593; 106/18.11; 106/18.26
[58] Field of Search ................ 524/431, 430, 524/435, 414, 417; 252/609; 423/593; 106/18.11, 18.26

[56] References Cited

U.S. PATENT DOCUMENTS 3,879,525 4/1975 Miyata et al. ................... 423/277
5,196,143 3/1993 Burba, III et al. ............... 252/315.5

*Primary Examiner*—Sharon Gibson
*Assistant Examiner*—Joseph D. Anthony
*Attorney, Agent, or Firm*—Wenderoth, Lind & Ponack

[57] ABSTRACT

A composite metal hydroxide which is a solid solution of the formula (1), $$Mg_{1-x}M^{2+}_x(OH)_2 \qquad (1)$$

wherein $M^{2+}$ is at least one divalent metal ion selected from the group consisting of $Mn^{2+}$, $Fe^{2+}$, $Co^{2+}$, $Ni^{2+}$, $Cu^{2+}$ and $Zn^{2+}$, and x is in the range of $0.001 \leq x \leq 0.9$, a flame retardant containing the above composite metal hydroxide, and a flame-retardant resin and/or rubber composition containing the flame retardant.

2 Claims, No Drawings

COMPOSITE METAL HYDROXIDE AND ITS USE

This application is a divisional of application Ser. No. 08/063,055 filed May 19, 1993, now U.S. Pat. No. 5,401,442, which is a continuation-in-part of now abandoned application Ser. No. 07/825,276, filed Jan. 24, 1992.

BACKGROUND OF THE INVENTION

1. Field of the Invention

The present invention relates to a composite metal hydroxide, a flame retardant containing the composite metal hydroxide which is capable of exhibiting excellent flame retardancy and acid resistance when incorporated into resins and rubbers (to be sometimes simply referred to as "resin" or "resins" hereinafter), and a flame-retardant resin and/or rubber composition (to be sometimes simply referred to as "resin composition" hereinafter) containing the flame retardant. More specifically, the present invention relates to a halogen-free composite metal hydroxide capable of imparting a resin with excellent flame retardancy and acid resistance, a flame retardant containing, as an active component, the composite metal hydroxide and being free from a foaming trouble of a molded article, which occurs due to the decomposition of a flame retardant at a resin-processing temperature, and a flame-retardant resin composition containing the flame retardant.

2. Prior Art of the Invention

In recent years, the flame retardancy of a resin has been increasingly demanded, and the severity of the demand is increasing. To satisfy such an increasing demand for flame retardancy, a flame retardant containing an organic halide and antimony trioxide in combination has been conventionally proposed and used. However, such flame retardant has the following defects: When a composition containing this flame retardant is processed, the flame retardant is partially decomposed to generate a halogen gas. As a result, the processing and molding machines are corroded. Further, this flame retardant has toxicity to workers, has a harmful influence on the heat resistance and weatherability of a resin, and generates a large amount of smoke containing a toxic gas during the combustion.

It has been therefore increasingly demanded to develop a halogen-free flame retardant which is free from the above defects, and aluminum hydroxide and magnesium hydroxide have attracted attention. However, aluminum hydroxide starts dehydration at about 190° C. to cause a foaming trouble of a molded article. Therefore, the molding temperature is required to be kept below 190° C., and the kind of resins to which aluminum hydroxide can be applied is limited.

Magnesium hydroxide starts dehydration at about 340° C., and therefore has an advantage in that it can be applied to almost all resins. Further, a process for synthesizing a magnesium hydroxide, by which a well-grown crystal of magnesium hydroxide can be produced, has been developed by inventors including the present inventor. As a result, excellent molded articles can be now obtained, and compositions containing such magnesium hydroxide are applied to communication cables, ships, and the like.

However, the above magnesium hydroxide has now been found to still have new problems to overcome. The first problem is that the above magnesium hydroxide exhibits its high-level flame retardancy only when a relatively large amount of it is incorporated into a resin. For example, when the above magnesium hydroxide is incorporated into polypropylene, it is required to incorporate about 150 to 250 parts by weight, per 100 parts by weight of polypropylene, of the above magnesium hydroxide in order to satisfy V-0 (highest flame retardancy level) of UL-94 flame retardancy standard at a thickness of ⅛ inch to 1/16 inch. When such a large amount of magnesium hydroxide is incorporated, the following problem arises: Out of the physical properties inherent to a resin, the Izod impact strength, elongation and tensile strength decrease.

The second problem is that a resin containing magnesium hydroxide is poor in acid resistance. For example, a molded article such as communication cable or a power cable produced from a resin composition containing polyethylene and magnesium hydroxide is in contact with water for a long period of time, magnesium hydroxide is gradually dissolved in carbonic acid contained in water and migrates toward the molded article surface to precipitate magnesium carbonate. As a result, the surface is whitened. The flame retardancy decreases in the long run by a proportion of magnesium hydroxide that has been dissolved and converted to magnesium carbonate. Further, the electric insulation of the above cables decreases.

SUMMARY OF THE INVENTION

It is an object of the present invention to provide a novel composite metal hydroxide.

It is another object of the present invention to provide a flame retardant which exhibits excellent flame retardancy effect even when it is used in a small amount as compared with conventional magnesium hydroxide.

It is further another object of the present invention to provide a flame retardant having excellent flame retardancy and excellent acid resistance.

It is still further another object of the present invention to provide a flame-retardant resin and/or rubber composition containing the above flame retardant.

The above objects and advantages and other objects and advantages of the present invention will be apparent from the following description.

According to the present invention, the above objects and advantages of the present invention are achieved by:

a composite metal hydroxide which is a solid solution of the formula (1), $$Mg_{1-x}M^{2+}{}_x(OH)_2 \qquad (1)$$

wherein $M^{2+}$ is at least one divalent metal ion selected from the group consisting of $Mn^{2+}$, $Fe^{2+}$, $Co^{2+}$, $Ni^{2+}$, $Cu^{2+}$ $Zn^{2+}$, and x is in the range of $0.001 \leq x \leq 0.9$, a flame retardant containing the above composite metal hydroxide, and a flame-retardant resin and/or rubber composition containing 100 parts by weight of a resin and/or a rubber and 20 to 250 parts by weight of the above flame retardant.

DETAILED DESCRIPTION OF THE PRESENT INVENTION

The present inventor has made studies to provide a flame retardant and a flame-retardant resin composition, which can advantageously overcome the above new problems in the use of magnesium hydroxide as a flame retardant. As a result, the present inventor has come to the conclusion that the solution of the above problems is essentially difficult as far as magnesium hydroxide is used, since the problems derive from the properties inherent to magnesium hydroxide. And the present inventor has made a further study.

That is, the present inventor has found that a flame retardant and flame-retardant resin composition which can overcome the above problems can be obtained by forming a complex, more specifically solid solution, of magnesium hydroxide and a hydroxide of at least one transition metal selected from Mn, Fe, Co, Ni, Cu and Zn, the use of which as a flame retardant has been considered to be substantially impossible since these metals per se are decomposed to start dehydration at a lower temperature than aluminum hydroxide. On the basis of the above finding, the present invention has been completed.

In the course of the study of composite metal hydroxide of the present invention, very surprising and remarkable properties have been found, which finding has led to the present invention.

The first finding is that the decomposition, i.e., dehydration temperature of the composite metal hydroxide is below that of magnesium hydroxide and decreases nearly in proportion to an amount of the transition metal hydroxide in a solid solution, and that the degree of the decrease in the dehydration temperature of the composite metal hydroxide differs depending upon transition metals. As a result, there can be provided a composite metal hydroxide very useful as a flame retardant for a resin, which has a dehydration start temperature of about 200° to 340° C., and is dehydrated at any decomposition (dehydration) peak temperature between 320° C. and 430° C. The above dehydration start temperature of the composite metal hydroxide is higher than that of aluminum hydroxide, about 190° C., which is a little too low, and lower than that of magnesium hydroxide, about 340° C., which is higher than the ignition temperature of most of resins and rubbers. It is assumed that excellence in the flame retardancy of the above composite metal hydroxide is based on the fact that high flame retardancy can be obtained when the combustion temperature of a resin (exothermic reaction) and the decomposition.dehydration temperature (endothermic reaction) of a metal hydroxide incorporated are close to each other.

The second finding is that the above transition metals have an additional effect that they improve the flame retardancy by promoting carbonization of a resin during combustion due to their dehydrogenation catalytic action.

The third finding is that the transition metals have a characteristic feature in that they remarkably improve the acid resistance as compared with magnesium hydroxide, although the degree of the improvement differs depending upon the kind of transition metals. This characteristic feature of nickel is particularly remarkable.

The composite metal hydroxide of the formula (1) is a solid solution formed of $Mg(OH)_2$ and $M^{2+}(OH)_2$. Therefore, the X-ray diffraction pattern of its powder is substantially the same as that of magnesium hydroxide, although the diffraction angle slightly varies depending upon the ionic radius and amount of $M^{2+}$. Further, when the composite metal hydroxide is measured for heat decomposition temperature by differential thermal analysis (DTA), the composite metal hydroxide does not show two endothermic decomposition temperatures corresponding to the decomposition temperatures inherent to the above two hydroxides, but shows one decomposition temperature as a single compound, crystal. The range of "x" in the formula (1) is dominated by the kind of $M^{2+}$, i.e., an ionic radius of $M^{2+}$.

As the ionic radius of $M^{2+}$ nears that of $Mg^{2+}$, a solid solution containing $Mg^{2+}$ in a wider range can be easily formed, and the range of x is therefore wider. As a result, the range of x varies depending upon the kind of $M^{2+}$.

More specifically, the range of x depending upon the kind of $M^{2+}$ is as follows:

$0.001 \leq x < 0.2$: zinc, copper $0.001 \leq x \leq 0.5$: manganese, iron $0.001 \leq x \leq 0.9$: nickel, cobalt.

In the beginning, the present inventor had the following thought: When x is not more than 0.005, a decrease in the decomposition temperature of the composite metal hydroxide from the decomposition temperature of magnesium hydroxide is small. When x is not less than 0.7, the decomposition temperature of the composite metal hydroxide nears the decomposition temperature of aluminum hydroxide. Therefore, the composite metal hydroxide has a poor effect on improvement of the flame retardancy, and a foaming occurs.

As a result of the present inventor's further study, it has been found that even when x is outside the above range, the composite metal hydroxide is effective as a flame retardant. That is, even when x is 0.005 or less, the composite metal hydroxide has excellent flame retardancy due to carbonization catalytic action of $M^{2+}$ as compared with magnesium hydroxide.

Further, the present inventor had an inital thought as follows. When x is 0.7 or more, the decomposition temperature of the composite metal hydroxide nears that of aluminum hydroxide, and the composite metal hydroxide might foam at a processing temperature of about 200° C. or higher. However, the present inventor's further study has shown the following: The above 200° C. is higher than the decomposition temperature of aluminum hydroxide by about 10° C., and when a crystal of the composite metal hydroxide is grown to be large, not only the decomposition temperature increases but also the processability is improved. As a result, the composite metal hydroxide is improved in antifoaming properties. Eventually, when x in the formula (1) is in the range up to 0.9, the composite metal hydroxide shows heat resistance and antifoaming properties equivalent to or higher than those of aluminum hydroxide.

Therefore, in the present invention, even when the amount of the transition metal as $M^{2+}$ is in a smaller range, that is, x in the formula (1) is even in the lower range of $0.001 \leq x \leq 0.005$, the composite metal hydroxide shows excellent flame retardancy over magnesium hydroxide. In particular, the carbonization catalysis promoting action of nickel is remarkable. Further., when a transition metal such as nickel or cobalt is used, a solid solution is formed in the entire composition of the composite metal hydroxide. In this case, even when x is in a greater range, i.e., in the range of $0.7 \leq x \leq 0.9$, the composite metal hydroxide retains heat resistance and antifoaming properties equivalent to or higher than those of aluminum hydroxide widely used as a flame retardant, and at the same time, the endothermic dehydration decomposition temperature of the composite metal hydroxide of the formula (1) nears the exothermic decomposition temperature of a resin. Thus, the composite metal hydroxide has an effect of preventing the ignition of the resin. Furthermore, the composite metal hydroxide exhibits excellent flame retardancy due to the carbonization catalysis promoting action on a resin by $M^{2+}$ in the formula (1). Of the transition metals as $M^{2+}$, nickel and cobalt remarkably improve the acid resistance in which magnesium hydroxide is deficient, and as a result, the composite metal hydroxide containing cobalt and/or nickel is remarkably improved in water resistance and insulation properties.

In the composite metal hydroxide of the formula (1), the size of the crystallite is 0.2 to 4 μm, preferably 0.4 to 2 μm, more preferably 0.6 to 1 μm, and almost no secondary aggregates are contained, or secondary aggregates are scarcely contained. That is, the average secondary particle diameter is 0.2 to 4 μm, preferably 0.4 to 2 μm, and the BET specific surface area is 1 to 20 m²/g, preferably 3 to 15 m²/g. The ranges of the above property values of the composite metal hydroxide are ranges preferred to keep various properties such as compatibility with a resin, dispersibility, moldability or processability, and appearance, mechanical strength and flame retardancy of a molded article in suitable ranges.

In the composite metal hydroxide of the formula (1), $M^{2+}$ is at least one divalent metal ion selected from the group consisting of $Mn^{2+}$, $Fe^{2+}$, $Co^{2+}$, $Ni^{2+}$, $Cu^{2+}$ and $Zn^{2+}$. When $M^{2+}$ consists of a plurality of divalent metal ions, x is a total of these metal ions. Of the above divalent metal ions, most preferred are $Co^{2+}$, $Ni^{2+}$ and $Zn^{2+}$. $Co^{2+}$ and $Ni^{2+}$ can form a solid solution even when x is anywhere in the entire range specified. $Ni^{2+}$ not only exhibits a particularly remarkable effect on improvement in acid resistance, and but also exhibits excellent effect on carbonization catalysis promoting action on a resin. $Zn^{2+}$ is white, and exhibits an effect of decreasing the decomposition temperature even when a small amount thereof is incorporated.

Therefore, as the composite metal hydroxide of the formula (1), preferred is the composite metal hydroxide of the formula (2),

$$Mg_{1-x}(Ni^{2+} \text{ and/or } Zn^{2+})_x(OH)_2 \qquad (2)$$

wherein x is as defined in the formula (1).

The composite metal hydroxide of the present invention can be directly used as a flame retardant. Further, the composite metal hydroxide of the present invention may be surface-treated with at least one surface treating agent selected from the group consisting of higher fatty acids, anionic surfactants, phosphate esters, coupling agents (of silane, titanate or aluminum type) and esters of polyhydric alcohols and fatty acids.

The surface treating agent is preferably selected from higher fatty acids having 10 or more carbon atoms such as stearic acid, erucic acid, palmitic acid, lauric acid and behenic acid; sulfates of higher alcohols such as stearyl alcohol and oleyl alcohol; anionic surfactants such as a salt of sulfate of polyethylene glycol ether, a salt of amide-bonded sulfate ester, a salt of ester-bonded sulfate, ester-bonded sulfonate, amide-bonded sulfonate, ether-bonded sulfonate, ether-bonded alkylallyl sulfonate, ester-bonded alkylallyl sulfonate and amide-bonded alkylallyl sulfonate; phosphate esters such as mono- or diesters of orthophosphoric acid with oleyl alcohol and stearyl alcohol, mixtures of these, acid type or alkali metal salts or amine salts thereof; silane-coupling agents such as vinylethoxysilane, vinyltris(2-methoxy-ethoxy)silane, γ-methacryloxypropyltrimethoxysilane, γ-aminopropyltrimethoxysilane, β-(3,4-epoxycyclohexyl)ethyltrimethoxysilane, γ-glycidoxypropyltrimethoxysilane and γ-mercaptopropyltrimethoxysilane; titanate coupling agents such as isopropyltriisostearoyl titanate, isopropyltris(dioctylpyrophosphate) titanate, isopropyltri(N-aminoethyl-aminoethyl) titanate and isopropyltridecylbenzenesulfonyl titanate; aluminum coupling agents such as acetoalkoxyaluminum diisopropylate; and esters of polyhydric alcohols and fatty acids such as glycerin monostearate and glycerin monooleate.

The surface coating treatment of the composite metal hydroxide of the formula (1) with the surface treating agent can be carried out by a known method. For example, a wet method may be carried out by adding a liquid or emulsion of the surface treating agent to the composite metal hydroxide and mechanically and fully mixing these at a temperature up to about 100° C. A dry method may be carried out by adding a liquid, emulsion or solid of the surface treating agent to a powder of the composite metal hydroxide while the powder is fully stirred with a stirrer such as a Henschel mixer, and fully mixing these with or without heating. The amount of the surface treating agent may be freely selected, but it is preferably about 0.1 to about 10% by weight on the basis of the weight of the composite metal hydroxide.

The surface-treated composite metal hydroxide may be washed, dehydrated, granulated, dried, milled and classified as required.

The composite metal hydroxide of the present invention can be produced by various methods, for example, by a coprecipitation method in which an alkali in an amount of about 1 equivalent weight or less, preferably 0.95 equivalent weight or less per equivalent weight of the total of Mg and $M^{2+}$ is added to an aqueous solution containing Mg ion and $M^{2\circ}$ ion at a temperature, preferably, of about 40° C. or lower with stirring to form a precipitate, or by a method in which MgO and/or $Mg(OH)_2$ and an aqueous solution containing $M^{2+}$ ion are mixed and allowed to react. The composite metal hydroxide can be also produced by a sol-gel method in which an alcoholate of Mg and $M^{2+}$ is hydrolyzed.

In the above-produced composite metal hydroxide, it is preferable to grow its crystal further and reduce its secondary aggregation by a method in which the composite metal hydroxide is subjected to water and heat treatment in an autoclave at about 110° C. to 250° C. for about 1 hour or more while its reaction mother liquor is copresent or by further adding a crystal growth promoter such as $CaCl_2$, $CaBr_2$, $MgCl_2$, NaCl or KCl.

The Mg ion source used for the formation of the composite metal hydroxide is selected from alcoholates such as magnesium chloride, magnesium bromide, magnesium iodide, magnesium acetate, magnesium ethoxide and magnesium propoxide, bittern, sea water and underground brine. The $M^{2+}$ ion source is selected from alcoholates such as chloride, bromide, iodide, fluoride, nitrate, formate, acetate, propioxide, ethoxide, propoxide and isopropoxide of divalent metal ion(s) selected from the group consisting of $Mn^{2+}$, $Fe^{2+}$, $Co^{2+}$, $Ni^{2+}$, $Cu^{2+}$ and $Zn^{2+}$.

The alkali used for the formation of the composite metal hydroxide is selected from sodium hydroxide, potassium hydroxide, calcium hydroxide (natural and synthetic), ammonia water and ammonia gas.

In the above materials, those having a higher purity are preferred. In particular, the concentration of polyvalent metal ions such as sulfate ion, borate ion, silicate ion, etc., is not more than 100 ppm, preferably not more than 10 ppm based on the total amount of MgO, $M^{2+}O$ and an alkaline solid.

The resin and rubber used in the present invention include thermoplastic resins such as polyethylene, an ethylene-other α-olefin copolymer, a copolymer of ethylene with vinyl acetate, ethyl acrylate or methyl acrylate, polypropylene, a propylene-other α-olefin copolymer, polybutene-1, polystyrene, a styrene-acrylonitrile copolymer, a copolymer of ethylene with propylenediene rubber or butadiene, vinyl acetate, polyacrylate, polymethacrylate, polyurethane, polyester, polyether and polyamide; thermosetting resins such as phenolic resin, melamine resin, epoxy resin, unsaturated polyester resin and alkyd resin; EPDM, SBR, NBR, butyl rubber, isoprene rubber, and chlorosulfonated polyethylene, although the resin and rubber shall not be limited to these.

The amount of the composite metal hydroxide of the formula (1) based on the resin can be suitably selected depending upon the kind of the resin, the kind of the composite metal hydroxide of the formula (1), and the like. In general, the amount of the composite metal hydroxide, which is surface-treated or not surface treated, per 100 parts by weight of the resin is about 20 to about 250 parts by weight, preferably about 30 to about 200 parts by weight. When this amount is less than the above lower limit, the flame retardancy is insufficient. When this amount exceeds the above upper limit, disadvantageously, the tensile strength, the Izod impact strength, etc., may sometimes decrease, or the acid resistance may sometimes deteriorated.

The method for mixing or kneading the resin and the composite metal hydroxide of the formula (1) is not specially limited, and any means may be employed if a uniform mixture can be prepared. For example, the mixing or kneading can be carried out with a single-screw or twin-screw extruder, a roll, Banbury mixer, or the like. Neither is the method for processing or molding the composition specially limited. For example, the composition can be processed or molded by injection molding, extrusion, blow molding, press molding, rotational molding, calendering, sheet forming, transfer molding, laminated molding, vacuum forming, and the like.

The resin and/or rubber composition of the present invention may contain other additives in addition to the composite metal hydroxide of the formula (1). For example, there may be used a flame retardant aid containing at least one of carbon powders, ferrocene, anthracene, polyacetylene, red phosphorus, acrylic fibers, nickel oxide and fibrous magnesium hydroxide. The amount of the flame retardant aid is preferably used in an amount of about 0.1 to about 10 parts by weight per 100 parts by weight of the resin and/or rubber.

Further, a lubricant which can also work for improving water resistance and acid resistance (whitening preventor) may be used as required. The lubricant is selected from zinc behenate, magnesium behenate, zinc stearate, calcium stearate, magnesium stearate, lead stearate and aluminum stearate. The lubricant is used in an amount of about 0.1 to about 10 parts by weight per 100 parts by weight of the resin and/or rubber.

The flame-retardant resin composition of the present invention may further contain other conventional additives such as an antioxidant, a ultraviolet light preventer, an antistatic agent, a pigment, an antifoaming agent, a plasticizer, a filler, a reinforcing material, an organohalogen flame retardant and a crosslinking agent.

As described above, the present invention provides a novel composite metal hydroxide, a flame retardant containing the novel composite metal hydroxide as an active component, and a flame-retardant resin and/or rubber composition containing the flame retardant. The above composite metal hydroxide and the above flame retardant can exhibit excellent flame retardancy and excellent acid resistance when incorporated into a resin and/or rubber. The above flame-retardant resin and/or rubber composition is excellent in flame retardancy and acid resistance. Further, the present invention provides a flame retardant which can exhibit excellent flame retardancy and acid resistance and which is free from foaming of a molded article caused by decomposition of a flame retardant at a temperature for processing a resin and/or rubber, and the present invention also provides a flame-retardant resin and/or rubber composition containing this flame retardant. Furthermore, the present invention provides a flame retardant containing, as an active component, a composite metal hydroxide which can be allowed to have a decomposition.dehydration temperature similar to the combustion temperature of a resin or rubber by freely adjusting the dehydration start temperature of the composite metal hydroxide, and the present invention also provides a flame-retardant resin and/or rubber composition containing this flame retardant. Moreover, the present invention provides a flame retardant which can give intended flame retardancy even in a relatively small amount, and the present invention also provides a flame-retardant resin and/or rubber composition containing this flame retardant and being excellent in Izod impact strength and mechanical properties.

The present invention will be explained further in detail hereinafter by reference to Examples.

EXAMPLE 1

Magnesium chloride and manganese chloride, reagents of first grade, were dissolved in deoxidation-treated, deionized water to prepare 10 liters of a mixed aqueous solution containing 2.0 mol/l of magnesium chloride and 0.2 mol/l of manganese chloride. The mixed solution was charged into a 20-liter cylindrical reactor made of stainless steel, and the temperature in the reactor was adjusted to 20° C. While the mixed solution was stirred with a chemistirrer in an atmosphere of $N_2$ gas, 8.0 liters of a slaked lime solution containing 2.5 mol/l of synthetic slaked lime ($Ca(OH)_2$) (synthesized by coprecipitation of calcium chloride and sodium hydroxide, reagents of first grade) was added over about 2 minutes, the amount of 8.0 liters corresponding to about 90 percent of the total equivalent weight of Mg and Mn. The resultant mixture was further stirred for 20 minutes to allow it to react. Immediately thereafter, the reaction mixture was charged into a 25-liter autoclave, and hydrothermally treated at 150° C. for 2 hours. Then, it was dehydrated with a filter press, washed with water, dehydrated and dried under vacuum. The resultant dried product was milled, and measured for chemical analysis value, BET specific surface area, average secondary particle diameter, X-ray diffraction pattern, and differential thermal analysis (DTA) - thermogravimetric analysis (TGA) values.

The BET specific surface area was measured by an $N_2$ adsorption method, the average secondary particle diameter was measured by subjecting a sample powder, which had been ultrasonic dispersion treated in a 0.2% sodium hexam-phosphate aqueous solution, to a microtrack method, and the DTA-TGA was measured under an atmosphere of $N_2$. Table 1 shows the results.

EXAMPLE 2

Example 1 was repeated except that the mixed solution was prepared from 2.06 mol/l of magnesium chloride and 0.16 mol/l of ferrous chloride, which were reagents of first grade, and that the temperature for hydrothermally treating the reaction mixture was changed to 170° C. Table 1 shows the results of measurements of the resultant product.

EXAMPLE 3

Example 1 was repeated except that the mixed aqueous solution was prepared from 2.1 mol/l of magnesium chloride and 0.12 mol/l of cobaltous chloride, which were reagents of first grade, that there was added a synthetic slaked lime solution (same as that used in Example 1) in an amount of 8.0 liters which corresponded to about 93 percent of the total equivalent weight of Mg and $Co^{2+}$, and that the temperature and time for hydrothermally treating the reaction mixture were changed to 180° C. and 4 hours. Table 1 shows the results of measurements of the reaction product.

EXAMPLE 4

Nickel chloride, reagent of first grade, was dissolved in ionic bittern (which was a by-product obtained from an ion-exchange membrane method NaCl and mainly contained $MgCl_2$, $CaCl_2$ and $MgBr_2$) to prepare 10 liters of a mixed aqueous solution containing 2.1 mol/l of Mg and 0.04 mol/l of Ni. The mixed aqueous solution was temperature-adjusted to 25° C., and charged into a 20-liter cylindrical reactor made of stainless steel. 8.0 Liters of a slaked lime solution containing 2.5 mol/l of synthetic slaked lime (same as that used in Example 1) was temperature-adjusted to about 25° C., the amount of 8.0 liters corresponding to about 93 percent of the total equivalent weight of Mg and Ni, and then added to the above mixed aqueous solution over about 3 minutes with stirring, and the resultant mixture was further stirred for 20 minutes to allow it to react. The reaction mixture was charged into a 25-liter autoclave, and subjected to hydrothermal treatment at 180° C. for 3 hours. Then, it was dehydrated with a filter press, washed with water, dehydrated, dried in an oven, and milled. Table 1 shows the results of measurements of the reaction product.

EXAMPLE 5

Example 4 was repeated except that the Mg concentration in the mixed aqueous solution was changed to 1.87 mol/l, that the Ni concentration in the mixed aqueous solution was changed to 0.14 mol/l and that the amount of synthetic slaked lime was changed to 7.0 liters. Table 1 shows the results of measurements of the reaction product.

EXAMPLE 6

Example 4 was repeated except that the Mg concentration in the mixed aqueous solution was changed to 1.13 mol/l, that the Ni concentration in the mixed aqueous solution was changed to 0.48 mol/l and that the amount of synthetic slaked lime was changed to 6.0 liters. Table 1 shows the results of measurements of the reaction product.

EXAMPLE 7

Example 4 was repeated except that the Mg concentration in the mixed aqueous solution was changed to 0.80 mol/l, that the Ni concentration in the mixed aqueous solution was changed to 0.93 mol/l and that the amount of synthetic slaked lime was changed to 6.4 liters. Table 1 shows the results of measurements of the reaction product.

EXAMPLE 8

Example 4 was repeated except that the Mg concentration in the mixed aqueous solution was changed to 2.1 mol/l, and that 0.04 mol/l of cupric chloride, a reagent of first grade, was used in place of nickel. Table 1 shows the results of measurements of the reaction product.

EXAMPLE 9

Example 4 was repeated except that the Mg concentration in the mixed aqueous solution was changed to 2.13 mol/l, that 0.02 mol/l of zinc nitrate, a reagent of first grade, was used in place of nickel, and that the temperature and time for hydrothermally treating the reaction mixture were changed to 120° C. and 4 hours. Table 1 shows the results of measurements of the reaction product.

EXAMPLE 10

Example 4 was repeated except that the Mg concentration in the mixed aqueous solution was changed to 2.01 mol/l, that 0.14 mol/l of zinc nitrate, a reagent of first grade, was used in place of nickel, and that the synthetic slaked lime was replaced with 2.5 mol/l of slaked lime (concentration 7.3 mol) prepared by calcining and hydrating natural limestone. Table 1 shows the results of measurements of the reaction product.

EXAMPLE 11

A 1,000-liter reactor was charged with 600 liters of filtered and decarboxylation-treated sea water (15° C., Mg concentration=0.052 mol/l). While the sea water was stirred, nickel chloride and zinc nitrate, reagents of first grade, were added, and the concentration each of these was adjusted to $9.7 \times 10^{-4}$ mol/l. Then, the mixture was temperature-adjusted to 20° C., and 11.7 liters of a slaked lime solution containing 2.5 mol/l of synthetic slaked lime (20° C.) was added over about 1 minute, the amount of 11.7 liters corresponding to about 90 percent of the total equivalent weight of Mg, Ni and Zn. The resultant mixture was further stirred for 20 minutes to allow it to react. The reaction mixture was dehydrated with a filter press, and the resultant cake was added to 2.0 mol/l of a calcium chloride aqueous solution, and dispersed therein with a stirrer. The dispersion was charged into a 25-liter autoclave, and subjected to hydrothermal treatment at 190° C. for 6 hours. Then, the resultant product was dehydrated with a filter press, washed with water, dehydrated, dried and milled. Table 1 shows the results of measurements of the resultant product.

EXAMPLE 12

Example 4 was repeated except that an aqueous solution containing 0.6 mol/l of Mg and 1.12 mol/l of Ni was used in place of the mixed aqueous solution, and that the amount of the synthetic slaked lime was changed to 6.4 liters. Table 1 shows the results of measurements of the resultant reaction product.

COMPARATIVE EXAMPLE 1

Example 4 was repeated except that an aqueous solution containing 1.9 mol/l of Mg and 0.24 mol/l of zinc nitrate, a reagent of first grade, was used in place of the mixed aqueous solution. Table 1 shows the results of measurements of the resultant reaction product.

COMPARATIVE EXAMPLES 2–9

$Mn(OH)_2$ (Comparative Example 2) and $Fe(OH)_2$ (Comparative Example 3) synthesized by a method of coprecipitation of a chloride aqueous solution and sodium hydroxide under a nitrogen atmosphere, $Co(OH)_2$ as a reagent of first grade (Comparative Example 4), $Ni(OH)_2$ (Comparative Example 5), $Cu(OH)_2$ (Comparative Example 5), $Zn(OH)_2$ (Comparative Example 7) synthesized by a method of coprecipitation of a chloride aqueous solution and sodium hydroxide, a commercially available $Al(OH)_3$ (Comparative Example 8), and $Mg(OH)_2$ (Comparative Example 9) were measured in the same manner as in Example 1. Table 1 shows the results of measurements of the above products.

TABLE 1

| Example | Chemical Composition | BET specific surface area ($m^2/g$) | Average secondary particle diameter ($\mu m$) |
|---|---|---|---|
| Ex-1 | $Mg_{0.90}Mn_{0.10}(OH)_2$ | 15 | 0.56 |
| Ex-2 | $Mg_{0.92}Fe_{0.08}(OH)_2$ | 10 | 0.64 |
| Ex-3 | $Mg_{0.94}Co_{0.06}(OH)_2$ | 5 | 0.94 |
| Ex-4 | $Mg_{0.98}Ni_{0.02}(OH)_2$ | 6 | 0.81 |
| Ex-5 | $Mg_{0.86}Ni_{0.14}(OH)_2$ | 4 | 1.40 |
| Ex-6 | $Mg_{0.68}Ni_{0.32}(OH)_2$ | 5 | 0.90 |
| Ex-7 | $Mg_{0.42}Ni_{0.58}(OH)_2$ | 6 | 0.86 |
| Ex-8 | $Mg_{0.98}Cu_{0.02}(OH)_2$ | 12 | 0.45 |
| Ex-9 | $Mg_{0.99}Zn_{0.01}(OH)_2$ | 7 | 0.79 |
| Ex-10 | $Mg_{0.93}Zn_{0.07}(OH)_2$ | 19 | 0.41 |
| Ex-11 | $Mg_{0.96}Ni_{0.02}Zn_{0.02}(OH)_2$ | 9 | 0.71 |
| Ex-12 | $Mg_{0.30}Ni_{0.70}(OH)_2$ | 11 | 0.51 |
| CEx-1 | $Mg_{0.88}Zn_{0.12-y}(OH)_{2-2y}+yZ_nO$ | 13 | 0.35 |
| CEx-2 | $Mn(OH)_2$, synthesized | — | — |
| CEx-3 | $Fe(OH)_2$, synthesized | — | — |
| CEx-4 | $Co(OH)_2$, reagent | — | — |
| CEX-5 | $Ni(OH)_2$, reagent | — | — |
| CEx-6 | $Cu(OH)_2$, reagent | — | — |
| CEx-7 | $Zn(OH)_2$, synthesized | — | — |
| CEx-8 | $Al(OH)_3$, commercial product | — | — |
| CEx-9 | $Mg(OH)_2$, commercial product | — | — |

| Example | X-ray diffraction pattern | Dehydration start temperature (°C.) | Dehydration peak temperature (°C.) |
|---|---|---|---|
| Ex-1 | A | 275 | 390 |
| Ex-2 | A | 212 | 350 |
| Ex-3 | A | 244 | 380 |
| Ex-4 | A | 304 | 400 |
| Ex-5 | A | 295 | 402 |
| Ex-6 | A | 253 | 360 |
| Ex-7 | A | 245 | 350 |
| Ex-8 | A | 308 | 397 |
| Ex-9 | A | 300 | 415 |
| Ex-10 | A | 210 | 373 |
| Ex-11 | A | 265 | 380 |
| Ex-12 | A | 200 | 330 |
| CEx-1 | B | 250 | 333, 383 |
| CEx-2 | — | 120 | 180 |
| CEx-3 | — | 150 | 200 |
| CEx-4 | — | 150 | 240 |
| CEx-5 | — | 170 | 310 |
| CEx-6 | — | 40 | 160 |
| CEx-7 | — | 50 | 220 |
| CEx-8 | — | 190 | 320 |
| CEx-9 | — | 340 | 430 |

Note: Ex = Example, CEx = Comparative Example
A = similar to the diffraction pattern of $Mg(OH)_2$
B = two diffraction patterns, one similar to the diffraction pattern of $MG(OH)_2$ and the other similar to the diffraction pattern of ZnO/

EXAMPLES 13–19

The same powders of composite metal hydroxides as those obtained in Examples 1, 3, 4, 5, 8, 9 and 11 were respectively dispersed in water, fully dispersed with stirring, and temperature-adjusted to about 70° C. Then, an oleic acid aqueous solution (about 70° C.) in an amount, as oleic acid, of 1.5% by weight based on each composite metal hydroxide was added to each composite metal hydroxide, and the resultant mixtures were fully stirred to surface-treat the composite metal hydroxides, Then, the composite metal hydroxides were dehydrated, washed with water, granulated and dried.

In each of these Examples 13 to 19, 100 parts by weight of impact-resistant polypropylene, 0.2 part by weight of an antioxidant (a mixture of 0.1 part by weight of Irganox 1010 and 0.1 part by weight of Weston) and the composite metal hydroxide of which the composition and amount are shown in Table 2 were homogeneously mixed, and melt-kneaded with a twin-screw extruder at about 230° C. to give composite pellets. The pellets were dried with a vacuum dryer at 120° C. for 2 hours, and injection-molded with an injection molding machine at about 230° C. to give a test piece. The test piece was evaluated on injection-moldability, combustibility and mechanical strength. Table 2 shows the results.

COMPARATIVE EXAMPLES 10–14

Example 13 was repeated except that composite metal hydroxides shown in Table 2 were used in place of the composite metal hydroxides of the present invention to prepare test pieces, and the test pieces were evaluated on injection moldability, etc. Table 2 shows the results.

EXAMPLE 20

The same composite metal hydroxide powder as that obtained in Example 4 was dispersed in hot water having a temperature of about 80° C., and 3.0% by weight, based on the composite metal hydroxide, of a sodium salt of stearyl phosphate was added with stirring. And, the resultant mixture was fully stirred to surface-treat the composite metal hydroxide powder. Then, the mixture was dehydrated, washed with water, granulated and dried. Then, test pieces were prepared in the same manner as in Example 13 except that the above-prepared composite metal hydroxide and carbon black in amounts shown in Table 2 were added as flame retardants, and evaluated on injection moldability, etc. Table 2 shows the results.

EXAMPLE 21

The same composite metal hydroxide powder as that obtained in Example 9 was dispersed in hot water having a temperature of about 80° C., and 1.0 part by weight, based on the composite metal hydroxide, of a lauric acid was added with stirring. And, the resultant mixture was fully stirred to surface-treat the composite metal hydroxide powder. Then, the mixture was dehydrated, washed with water, granulated and dried. Then, test pieces were prepared in the same manner as in Example 13 except that the above-prepared composite metal hydroxide and an acrylic fiber (diameter 0.5 denier) in amounts shown in Table 2 were added as flame retardants, and evaluated on injection moldability, etc. Table 2 shows the results.

TABLE 2

| Example | Resin | Flame retardant | Amount* |
|---|---|---|---|
| Ex-13 | polypropylene | $Mg_{0.90}Mn_{0.10}(OH)_2$ | 190 |
| Ex-14 | polypropylene | $Mg_{0.94}Co_{0.06}(OH)_2$ | 180 |
| Ex-15 | polypropylene | $Mg_{0.98}Ni_{0.02}(OH)_2$ | 170 |
| Ex-16 | polypropylene | $Mg_{0.86}Ni_{0.14}(OH)_2$ | 175 |
| Ex-17 | polypropylene | $Mg_{0.98}Cu_{0.02}(OH)_2$ | 190 |
| Ex-18 | polypropylene | $Mg_{0.99}Zn_{0.01}(OH)_2$ | 190 |
| Ex-19 | polypropylene | $Mg_{0.96}Ni_{0.02}Zn_{0.02(OH)2}$ | 160 |
| CEx-10 | polypropylene | $Mg(OH)_2$ (CEx-9) | 190 |
| CEx-11 | polypropylene | $Al(OH)_3$ (CEx-8) | 190 |
| CEx-12 | polypropylene | $Ni(OH)_2$ (CEx-5) | 190 |
| CEx-13 | polypropylene | $Mg_{0.30}Ni_{0.70}(OH)_2$ | 190 |
| CEx-14 | polypropylene | $Mg_{0.88}Zn_{0.12-y}(OH)_{2-2y}+yZnO$ | 190 |
| Ex-20 | polypropylene | $Mg_{0.98}Ni_{0.02}(OH)_2$ carbon black | 150 2.5 |
| Ex-21 | polypropylene | $Mg_{0.99}Zn_{0.01}(OH)_2$ acrylic fiber | 170 2.5 |

| Example | Injection moldability Molded article appearance | Combustibility | Tensile break strength (kg · f/cm$^2$) | Notched Izod impact strength (kg · cm/cm) |
|---|---|---|---|---|
| Ex-13 | A | V-0 | 187 | 5.9 |
| Ex-14 | A | V-0 | 195 | 9.3 |
| Ex-15 | A | V-0 | 210 | 12.9 |
| Ex-16 | A | V-0 | 194 | 19.6 |
| Ex-17 | A | V-0 | 185 | 5.9 |
| Ex-18 | A | V-0 | 189 | 6.1 |
| Ex-19 | A | V-0 | 218 | 14.2 |
| CEx-10 | A | V-2 | 172 | 4.6 |
| CEx-11 | D | out of standard | — | — |
| CEx-12 | D | out of standard | — | — |
| CEx-13 | B | V-2 | 180 | 5.2 |
| CEx-14 | A | V-2 | 170 | 4.0 |
| Ex-20 | A | V-0 | 223 | 19.8 |
| Ex-21 | A | V-0 | 230 | 18.5 |

Note: Ex = Example, CEx = Comparative Example
Amount* per 100 parts by weight of resin
A = excellent in both injection moldability and molded article appearance
B = somewhat poor in injection moldability and showing a flash pattern on a molded article appearance
D = foaming too extremely to mold
Combustibility: measured according to UL-94 at a thickness of 1/16 inch.

EXAMPLE 22 AND COMPARATIVE EXAMPLE 15

The same composite metal hydroxide as that obtained in Example 10 and a commercially available magnesium hydroxide were respectively surface-treated with 1% by weight of vinyl-tris(2-methoxy-ethoxy)silane. The resultant flame retardants of which the amounts are shown in Table 3 were respectively mixed with ultralow-density linear polyethylene (VLLDPE). The resultant compositions were respectively melt-kneaded with a twin-screw extruder at 200° C. to prepare pellets, and the pellets were dried at 100° C. for 2 hours, and injection-molded at 200° C. The resultant test pieces were evaluated on injection moldability, etc. Table 3 shows the results.

EXAMPLE 23 AND COMPARATIVE EXAMPLE 16

The same composite metal hydroxide as that obtained in Example 11 and a commercially available magnesium hydroxide were respectively surface-treated with 1% by weight of γ-aminopropyltrimethoxysilane. The resultant flame retardants of which the amounts are shown in Table 3 were respectively mixed with nylon 6. The resultant compositions were respectively melt-kneaded with a twin-screw extruder at about 230° C. to prepare pellets, and the pellets were dried under vacuum, and injection-molded at 230° C. The resultant test pieces were evaluated on injection moldability, etc. Table 3 shows the results.

EXAMPLE 24 AND COMPARATIVE EXAMPLE 17

The same composite metal hydroxide as that obtained in Example 11 and commercially available magnesium hydroxide were respectively surface-treated with 1% by weight of isopropyltriisostearoyl titanate. Then, the resultant flame retardants of which the amounts are shown in Table 3 were respectively mixed with 100 parts by weight ethylene propylene diene rubber (EDPM) together with the following additives.

| | |
|---|---|
| Zinc oxide | 5 parts by weight |
| Promoter TT (tetramethylthiuramdisulfide) | 1.5 parts by weight |
| Sulfur | 0.5 part by weight |
| Stearic acid | 1.0 part |

The resultant mixtures were respectively melt-kneaded with an open roll at 150° C. The resultant kneaded products were respectively vulcanized with a press molding machine at 160° C. for 30 minutes to form sheets, and test pieces were taken from the sheets. The test pieces were evaluated on injection moldability, etc. Table 3 shows the results.

TABLE 3

| Example | Resin | Flame retardant | Amount* |
|---|---|---|---|
| Ex-22 | VLLDPE | $Mg_{0.93}Zn_{0.07}(OH)_2$ | 120 |
| CEx-15 | VLLDPE | $Mg(OH)_2$ | 120 |
| Ex-23 | nylon-6 | $Mg_{0.96}Zn_{0.02}Ni_{0.02}(OH)_2$ | 50 |
| CEx-16 | nylon-6 | $Mg(OH)l$ | 50 |
| Ex-24 | EDPM | $Mg_{0.98}Ni_{0.02}(OH)_2$ | 120 |
| CEx-17 | EDPM | $Mg(OH)_2$ | 120 |

| Example | Injection moldability Molded article appearance | Combustibility | Tensile break strength (kg · f/cm²) | Notched Izod impact strength (kg · cm/cm) |
|---|---|---|---|---|
| Ex-22 | A | V-0 | 151 | 800 |
| CEx-15 | A | out of standard | 128 | 730 |
| Ex-23 | A | V-0 | 850 | 8 |
| CEx-16 | A | V-2 | 831 | 2 |
| Ex-24 | — | V-0 | 106 | 440 |
| CEx-17 | — | out of standard | 84 | 410 |

Note: Ex = Example CEx = Comparative Example
Amount* = per 100 parts by weight of resin
A = excellent in both injection moldability and molded article appearance
Combustibility: measured according to UL-94 at a thickness of 1/16 inch

EXAMPLE 25 AND COMPARATIVE EXAMPLE 18

Test on acid resistance

While 30 ml of deionized water having a temperature of 35° C. was stirred in a 50 ml beaker with a magnetic stirrer, 100 mg of each flame retardant powder shown in Table 4 was introduced into the beaker, and uniformly stirred for 1 minutes. Then, the pH of the resultant solution was kept at 4.0 with a pH-stat, and the time during which 5.15 ml of 0.1N-HCl had been used up was measured. The greater the value (showing the time) is, the better the acid resistance is.

Resistance to carbonic acid water

Each flame retardant shown in Table 4 was surface-treated with 3% by weight, based on the flame retardant, of sodium stearate, and 130 parts by weight of the flame retardant was incorporated into 100 parts by weight of a high-density polyethylene. The resultant composition was melt-kneaded with a twin-screw extruder at 240° C., dried under vacuum, and injection-molded to form a test piece having a size of 13×127×3.2 mm. The test piece was immersed in 500 ml of deionized water, and while the temperature of the deionized water was kept at 20° C., a $CO_2$ gas was blown into the deionized water at a rate of about 500 ml/minute. The appearance of the test pieces was visually evaluated at five ratings. Table 4 shows the results.

TABLE 4

| Example | Flame retardant | pH stat test (minute) |
|---|---|---|
| Ex-25-1 | $Mg_{0.90}Mn_{0.10}(OH)_2$ | 2.0 |
| Ex-25-2 | $Mg_{0.94}Co_{0.06}(OH)_2$ | 1.6 |
| Ex-25-3 | $Mg_{0.98}Ni_{0.02}(OH)_2$ | 5.4 |
| Ex-25-4 | $Mg_{0.86}Ni_{0.14}(OH)_2$ | 44.2 |
| Ex-25-5 | $Mg_{0.68}Ni_{0.32}(OH)_2$ | 102.4 |
| CEx-18 | $Mg(OH)_2$ | 0.9 |

| | Resistance to carbonic acid water (whitening) | | |
|---|---|---|---|
| Example | 3 days after | 7 days after | 10 days after |
| Ex-25-1 | 5 | 4 | 3 |
| Ex-25-2 | 5 | 3 | 2 |
| Ex-25-3 | 5 | 5 | 4 |

TABLE 4-continued

| Ex-25-4 | 5 | 5 | 5 |
| Ex-25-5 | 5 | 5 | 5 |
| CEx-18 | 3 | 2 | 1 |

Note: The ratings in the evaluation on resistance to carbonic acid water: 5 = not whitened, 4 = slightly whitened, 3 = whitened, 2 = whitened greatly, 1 = whitened greatly all over

EXAMPLE 26

A 30-liter stainless steel reactor having a stirrer was charged with 10 liters of ionic bittern ($MgCl_2$= 2.9 mol/l and $CaCl_2$=0.8 mol/l), and then 0.13 mol of nickel nitrate was added and dissolved therein. The temperature of the resultant solution was adjusted to 20° C. While the solution was stirred with a chemistirrer, 13.1 liters of a slaked lime solution containing 2.0 mol/l of synthetic slaked lime ($Ca(OH)_2$) (synthesized by a coprecipitation reaction between calcium chloride and sodium hydroxide, reagents of first grade) having a temperature of 20° C. was added over about 2 minutes, the amount of 13.1 liters corresponding to about 90 percent of the total equivalent weight of Mg and Ni. The resultant mixture was further stirred for 20 minutes to allow it to react. The resultant reaction mixture was allowed to stand to form a precipitate, and the supernatant mother liquor was removed to give 18 liters of a remainder. The remainder was charged into a 25-liter autoclave, and hydrothermally treated at 160° C. for 3 hours. Part of the resultant product was filtered under reduced pressure, and the resultant solid was washed with water, dehydrated and dried.

The dried product was milled, chemically analyzed, measured for a BET specific surface area, an average secondary particle diameter, an X-ray diffraction pattern, and subjected to differential thermal analysis (DTA)—thermogravimetric analysis (TGA). The BET specific surface area was measured by an $N_2$ adsorption method, the average secondary particle diameter was measured by subjecting a sample powder, which had been ultrasonic dispersion treated in a 0.2% sodium hexa-m-phosphate aqueous solution, to a microtrack method, and the DTA-TGA was measured under a nitrogen atmosphere. Table 5 shows the results.

EXAMPLE 27

Example 26 was repeated except that the ionic bittern was replaced with 10 liters of ionic bittern containing 0.05 mol of nickel chloride, to give a dried product. The dried product had a chemical composition of $Mg_{0.998}Ni_{0.002}(OH)_2$. The dried product was measured for a BET specific surface area, etc., in the same manner as in Example 26. Table 5 shows the results.

EXAMPLE 28

Example 26 was repeated except that the ionic bittern was replaced with 10 liters of ionic bittern containing 0.1 mol of cobalt chloride, to give a dried product. The dried product had a chemical composition of $Mg_{0.996}Co_{0.004}(OH)_2$. The dried product was measured for a BET specific surface area, etc., in the same manner as in Example 26. Table 5 shows the results.

EXAMPLE 29

Example 26 was repeated except that the ionic bittern was replaced with 10 liters of ionic bittern containing 0.05 mol of nickel chloride and 0.05 mol of zinc nitrate, to give a dried product. The dried product had a chemical composition of $Mg_{0.996}Ni_{0.002}Zn_{0.002}(OH)_2$. The dried product was measured for a BET specific surface area, etc., in the same manner as in Example 26. Table 5 shows the results.

EXAMPLE 30

10 Liters of a mixed aqueous solution containing 0.72 mol/l of magnesium chloride and 1.5 mol/l of nickel chloride was temperature-adjusted to 15° C., and charged into a 20-liter cylindrical reactor made of stainless steel. While the mixed solution was stirred 8.0 liters of a slaked lime solution containing 2.5 mol/l of synthetic slaked lime, which had been temperature-adjusted to about 15° C., was added over about 3 minutes, the amount of 8.0 liters corresponding to about 90 percent of the total equivalent weight of Mg and Ni. The resultant mixture was further stirred for 20 minutes to allow it to react. Then, 16 mol of calcium chloride as a crystal growth promoter was added to the resultant reaction liquid and dissolved therein, and the resultant mixture was charged into a 25-liter autoclave and hydrothermally treated at 180° C. for 3 hours. The resultant reaction mixture was filtered under reduced pressure and washed with water, and part of it was taken, dried, and milled. The resultant milled product had a chemical composition of $Mg_{0.25}Ni_{0.75}(OH)_2$. The milled product was measured for a BET specific surface area, etc., in the same manner as in Example 26. Table 5 shows the results.

EXAMPLE 31

Example 30 was repeated except that 10 liters of the mixed aqueous solution was replaced with a mixed aqueous solution containing 0.46 mol/l of magnesium chloride, 1.74 mol/l of nickel chloride and 0.02 mol/l of zinc nitrate, to give a milled product. The milled product had a chemical composition of $Mg_{0.12}Ni_{0.87}Zn_{0.01}(OH)_2$. The milled product was measured for a BET specific surface area, etc., in the same manner as in Example 26. Table 5 shows the results.

COMPARATIVE EXAMPLES 19 AND 20

A commercially available aluminum hydroxide (Comparative Example 19, $Al(OH)_3$) and a commercially available magnesium hydroxide (Comparative Example 20, $Mg(OH)_2$) were measured in the same manner as in Example 26. Table 5 shows the results.

TABLE 5

| Example | BET specific surface area (m²/g) | Average secondary particle diameter (μm) | X-ray diffraction pattern | Dehydration start temperature (°C.) | Dehydration peak temperature (°C.) |
|---|---|---|---|---|---|
| Ex-26 | 6 | 0.82 | A | 339 | 429 |
| Ex-27 | 6 | 0.86 | A | 340 | 430 |
| Ex-28 | 7 | 0.7 | A | 339 | 428 |
| Ex-29 | 8 | 0.66 | A | 335 | 428 |
| Ex-30 | 7 | 0.76 | A | 235 | 338 |
| Ex-31 | 14 | 0.51 | A | 222 | 324 |
| CEx-19 | 10 | 1.28 | — | 190 | 320 |
| CEx-20 | 6 | 0.87 | Mg(OH)$_2$ | 340 | 430 |

Note: Ex = Example, CEx = Comparative Example
A = similar to the diffraction pattern of Mg(OH)$_2$

EXAMPLES 32–37

The reaction products washed with water and obtained in Examples 26 to 31 were respectively emulsified in water, and then temperature-adjusted to about 70° C. Then, a sodium oleate aqueous solution (about 70° C.) in an amount of 1.5 % by weight, as oleic acid, based on each reaction product, was added to each emulsion. The resultant mixtures were fully stirred to surface-treat the reaction products. The surface-treated products were dehydrated, washed with water, granulated and dried.

In each of these Examples 32 to 37, 100 parts by weight of impact-resistant polypropylene, 0.2 part by weight of an antioxidant (a mixture of 0.1 part by weight of Irganox 1010 and 0.1 part by weight of Weston-626) and the composite metal hydroxide of which the composition and amount are shown in Table 6 were homogeneously mixed, and melt-kneaded with a twin-screw extruder at about 220° C. to give composite pellets. The pellets were dried with a vacuum dryer at 120° C. for 2 hours, and injection-molded with an injection molding machine at about 220° C. to give a test piece. The test piece was evaluated on injection-moldability, combustibility and mechanical strength. Table 6 shows the results.

COMPARATIVE EXAMPLES 21 AND 22

Example 32 was repeated except that the composite metal hydroxide of the present invention was replaced with metal hydroxides shown in Table 6, and the resultant test pieces were evaluated in the same manner as in Example 32. Table 6 shows the results.

TABLE 6

| Example | Resin | Flame retardant From | Amount* | Injection moldability Molded article Appearance | Combusti- bility | Tensile break strength (kg · f/cm²) | Izod impact strength (kg · cm/cm) |
|---|---|---|---|---|---|---|---|
| Ex-32 | PP | Ex-26 | 190 | A | V-0 | 186 | 6.1 |
| Ex-33 | PP | Ex-27 | 190 | A | V-0 | 189 | 6.5 |
| Ex-34 | PP | Ex-28 | 190 | A | V-0 | 187 | 5.8 |
| EX-35 | PP | Ex-29 | 190 | A | V-0 | 185 | 5.5 |
| Ex-36 | PP | Ex-30 | 190 | A | V-0 | 192 | 5.0 |
| Ex-37 | PP | Ex-31 | 1 | A | V-0 | 191 | 6.0 |
|  |  | Ex-26 | 179 |  |  |  |  |
| CEx-21 | PP | CEx-19 | 190 | D | out of standard | — | — |
| CEx-22 | PP | CEx-20 | 190 | A | V-2 | 172 | 4.6 |

Notes: Ex = Example, CEx = Comparative Example
PP = polypropylene
Amount* = part per 100 parts by weight of resin
Injection moldability and molded article appearance:
A = excellent in both injection moldability and molded article appearance
B = somewhat poor in injection moldability and showing a flash pattern on a molded article appearance
D = foaming too extremely to mold
Combustibility: measured according to UL-94 at a thickness of 1/16 inch

EXAMPLES 38 AND 39, AND COMPARATIVE EXAMPLE 23

The composite metal hydroxides washed with water and obtained in Examples 26 and 30 were respectively emulsified in water, and 1% by weight of isopropyltriisostearoyl titanate was added to each emulsion to surface-treat each composite metal hydroxide. The commercially available magnesium hydroxide in Comparative Example 20 was also surface treated in the same manner as above. Then, the resultant flame retardants of which the amounts are shown in Table 3 were respectively mixed with 100 parts by weight of ethylene propylene diene rubber (EPDM) together with the following additives.

Zinc oxide 5 parts by weight
Vulcanization promoter
(tetramethylthiuramdisulfide) 1.5 parts by weight
Sulfur 0.5 part by weight
Stearic acid 1.0 part The resultant mixtures were respectively melt-kneaded with an open roll at 150° C. The resultant kneaded products were respectively vulcanized with a press molding machine at 160° C. for 30 minutes to form sheets, and test pieces were taken from the sheets. The test pieces were evaluated on injection moldability, etc. Table 7 shows the results.

TABLE 7

| Example | Flame retardant From | Amount | Molded article appearance | Combuti- bility | Tensile break strength (kg · f/cm$^2$) | elongation (%) |
|---|---|---|---|---|---|---|
| Ex-38 | Ex-26 | 120 | excellent | V-0 | 105 | 446 |
| Ex-39 | Ex-30 | 2 | excellent | V-0 | 111 | 434 |
|  | CEx-20 | 118 |  |  |  |  |
| CEx-23 | CEx-20 | 120 | excellent | out of standard | 84 | 410 |

Ex = Example, CEx = Comparative Example

What is claimed is:

1. A flame-retardant composition, comprising 100 parts by weight of at least one material selected from the group consisting of resin and rubber, and 20 to 250 parts by weight of a composite metal hydroxide which is a solid solution of the formula (1), $$Mg_{1-x}M^{2+}{}_x(OH)_2 \quad (1)$$

wherein $M^{2+}$ is at least one divalent metal ion selected from the group consisting of $Mn^{2+}$, $Fe^{2+}$, $Co^{2+}$, $Ni^{2+}$, $Cu^{2+}$ and $Zn^{2+}$, and x is in the range of $0.001 \leq x \leq 0.9$.

2. The flame-retardant composition according to claim 1, which further contains at least one additive selected from the group consisting of a carbon powder, red phosphorus, an acrylic fiber and nickel oxide.

* * * * *